US011560856B2

(12) United States Patent
Kokubu et al.

(10) Patent No.: US 11,560,856 B2
(45) Date of Patent: Jan. 24, 2023

(54) ENGINE SYSTEM

(71) Applicant: Mazda Motor Corporation, Hiroshima (JP)

(72) Inventors: Hironori Kokubu, Aki-gun (JP); Kenji Sasaki, Aki-gun (JP); Atsushi Yagi, Aki-gun (JP); Tomokuni Kusunoki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/454,324

(22) Filed: Nov. 10, 2021

(65) Prior Publication Data

US 2022/0195951 A1 Jun. 23, 2022

(30) Foreign Application Priority Data

Dec. 22, 2020 (JP) .............................. JP2020-212496

(51) Int. Cl.
*F02D 23/00* (2006.01)
*F02B 33/36* (2006.01)
(Continued)

(52) U.S. Cl.
CPC ............ *F02D 23/005* (2013.01); *F02B 33/36* (2013.01); *F02B 39/12* (2013.01);
(Continued)

(58) Field of Classification Search
CPC .......... F02B 33/36; F02B 33/38; F02B 39/12; F02D 23/00; F02D 23/005;
(Continued)

(56) References Cited

U.S. PATENT DOCUMENTS 5,133,326 A 7/1992 Nishimura et al.
5,564,400 A * 10/1996 Nishimura .......... F16H 61/0213
123/559.3

(Continued)

FOREIGN PATENT DOCUMENTS

JP 2019039393 A 3/2019

OTHER PUBLICATIONS

European Patent Office, Extended European Search Report Issued in Application No. 21205463.9, dated Apr. 21, 2022, Germany, 8 pages.

*Primary Examiner* — Audrey B. Walter
*Assistant Examiner* — Dapinder Singh
(74) *Attorney, Agent, or Firm* — Alleman Hall Creasman & Tuttle LLP

(57) ABSTRACT

An engine system is provided, which includes a supercharger driven by a crankshaft of an engine, an electromagnetic clutch disconnectably connecting the crankshaft to the supercharger, and a controller configured to output a control signal to the electromagnetic clutch. The controller includes a processor configured to execute an uphill-angle detecting module to detect an uphill angle during traveling of a vehicle, an uphill determining module to determine whether the detected uphill angle is above a given first uphill angle, and a boost controlling module to, when the detected uphill angle is above the first uphill angle, control the electromagnetic clutch to connect the crankshaft to the supercharger even when a target torque of the engine is within a not-boosting range.

15 Claims, 7 Drawing Sheets

(51) Int. Cl.
*F02B 39/12* (2006.01)
*F02D 41/00* (2006.01)
*F02D 41/02* (2006.01)
*F02D 41/14* (2006.01)

(52) U.S. Cl.
CPC ....... *F02D 41/0007* (2013.01); *F02D 41/022* (2013.01); *F02D 41/023* (2013.01); *F02D 41/1402* (2013.01); *F02D 2041/1427* (2013.01); *F02D 2200/1002* (2013.01); *F02D 2200/701* (2013.01)

(58) Field of Classification Search
CPC .............. F02D 41/0007; F02D 41/021; F02D 41/022; F02D 41/0225; F02D 41/023; F02D 41/1402; F02D 41/3041; F02D 2041/1427; F02D 2200/1002; F02D 2200/501; F02D 2200/701; F02D 2200/702; Y02T 10/12; Y02T 10/40
See application file for complete search history.

(56) References Cited

U.S. PATENT DOCUMENTS

| | | | |
|---|---|---|---|
| 10,006,508 B2 * | 6/2018 | Cho | ................. F16D 48/06 |
| 11,111,865 B2 * | 9/2021 | Hikitani | .................... F02B 1/12 |
| 11,236,684 B1 * | 2/2022 | Yamagata | ............ F02D 41/0007 |
| 2015/0377158 A1 * | 12/2015 | Benjey | ................. B60W 20/13 |
| | | | 903/905 |
| 2017/0298811 A1 | 10/2017 | Santillo et al. | |
| 2019/0093575 A1 | 3/2019 | Inoue et al. | |

* cited by examiner

ENGINE SYSTEM

TECHNICAL FIELD

The present disclosure relates to an engine system provided with an electromagnetic clutch which connects and disconnects a mechanical supercharger to/from a crankshaft.

BACKGROUND OF THE DISCLOSURE

Conventionally, technologies for an engine system mounted on an automobile are known, in which when an engine operates within, for example, a high-load range or a high-speed range, a booster boosts air to a combustion chamber of the engine in order to increase engine torque. Particularly, a mechanical supercharger (i.e., a supercharger) which performs boosting by using a rotary-drive force from a crankshaft of the engine excels in response compared with an exhaust-turbine supercharger (i.e., a turbocharger) which uses exhaust pressure of the engine.

An engine system disclosed in JP2019-039393A is provided with an electromagnetic clutch which connects a mechanical supercharger to a crankshaft when an engine operates within a given high-load range. In this engine system, for example, when the operation range of the engine is shifted from a low-load range to the high-load range corresponding to an accelerator opening being increased, thereby a target torque falling within a boosting range, the electromagnetic clutch connects the mechanical supercharger to the crankshaft. Accordingly, the mechanical supercharger can boost air to a combustion chamber of the engine to increase the engine torque.

Although the mechanical supercharger disclosed in JP2019-039393A excels in the response compared with the exhaust-turbine supercharger as described above, when a vehicle goes up a hill (slope), acceleration delay of the vehicle may be caused as a result of response delay of the electromagnetic clutch.

That is, when the engine load decreases corresponding to the change in the accelerator opening while traveling an uphill, the electromagnetic clutch is disengaged so that the mechanical supercharger becomes a non-boosting state. Therefore, even if the accelerator opening is increased during re-acceleration of the vehicle, a time-lag may occur between the re-engagement of the electromagnetic clutch and the start of the boosting. As a result, the response delay of the boosting by the mechanical supercharger may be caused during the uphill-traveling, which may lead to the acceleration delay of the vehicle.

SUMMARY OF THE DISCLOSURE

The present disclosure is made in view of the above situations, and one purpose thereof is to provide an engine system capable of reducing acceleration delay of a vehicle while traveling an uphill.

The engine system of the present disclosure maintains boosting by a mechanical supercharger when an uphill angle is above a given first uphill angle during the uphill-traveling, even within a non-boosting range, so as to reduce the acceleration delay of the vehicle.

According to one aspect of the present disclosure, an engine system is provided, which includes a supercharger driven by a crankshaft of an engine, an electromagnetic clutch disconnectably connecting the crankshaft to the supercharger, and a controller configured to output a control signal to the electromagnetic clutch. The controller includes a processor configured to execute an uphill-angle detecting module to detect an uphill angle during traveling of a vehicle, an uphill determining module to determine whether the detected uphill angle is above a given first uphill angle, and a boost controlling module to, when the uphill determining module determines that the uphill angle is above the first uphill angle, control the electromagnetic clutch to connect the crankshaft to the supercharger even when a target torque of the engine is within a non-boosting range.

According to this configuration, when the uphill determining module determines that the uphill angle detected by the uphill-angle detecting module is above the first uphill angle, the boost controlling module controls the electromagnetic clutch to connect the crankshaft to the supercharger even if the target torque of the engine falls within the non-boosting range in which boosting is not performed. Therefore, even when the engine load changes during the uphill-traveling, the supercharger can always perform boosting regardless of the engine load when the uphill angle is above the first uphill angle. Therefore, response delay of the boosting can be reduced, and acceleration delay of the vehicle can be reduced.

The boost controlling module may control the electromagnetic clutch to be disengaged when the uphill determining module determines that the uphill angle has fallen below a second uphill angle smaller than the first uphill angle.

According to this configuration, since the electromagnetic clutch is disengaged after the uphill angle has fallen below the second uphill angle which is smaller than the first uphill angle during the uphill-traveling, the disengagement of the electromagnetic clutch can be delayed, and a boosting period continued during the uphill-traveling can be made longer. As a result, the response delay in the re-acceleration during the uphill-traveling can be reduced for a long period.

The controller may further include a timer. The timer may be actuated when the uphill determining module determines that the uphill angle has fallen below the second uphill angle. The boost controlling module may control the electromagnetic clutch to be disengaged after the timer measures a given period of time.

According to this configuration, by using the timer, the timing to disengage the electromagnetic clutch can be delayed for the given period which is set arbitrarily, and thus, the boosting period continued during the uphill-traveling can be made longer.

The first uphill angle may be set to be smaller as a gear stage of a transmission becomes higher.

There is a tendency that an engine speed decreases and the acceleration of the vehicle takes longer time as the transmission gear stage becomes higher. Here, according to this configuration, by setting the first uphill angle to be smaller as the transmission gear stage is shifted up, the electromagnetic clutch can be engaged early even when the transmission gear stage is high during the uphill-traveling, and thus, the response delay in the re-acceleration during the uphill-traveling can be reduced.

The supercharger may be a mechanical supercharger mechanically linked with an engine body.

The non-boosting range may include a range where spark controlled compression ignition combustion with an excess air ratio higher than 1 is performed.

The non-boosting range may include a range where spark controlled compression ignition combustion with an excess air ratio higher than 1 is performed, and a boosting range may include a range where spark ignition combustion, or spark controlled compression ignition combustion with an excess air ratio at 1, is performed.

When the uphill determining module determines that the uphill angle is above the first uphill angle, the controller may control the supercharger to perform boosting regardless of the target engine torque calculated by a target torque calculating module. When the uphill determining module determines that the uphill angle has fallen below the second uphill angle smaller than the first uphill angle, the controller may control the electromagnetic clutch to disconnect the crankshaft from the supercharger.

The controller may store a map defining a relationship between a vehicle speed and the first uphill angle for each gear stage of a transmission. The first uphill angle may be set to be smaller as the gear stage becomes higher at the same vehicle speed.

DETAILED DESCRIPTION OF THE DISCLOSURE

Hereinafter, one preferred embodiment of the present disclosure is described in detail with reference to the accompanying drawings.

(1) Overall Configuration of Engine System

Figure 1:
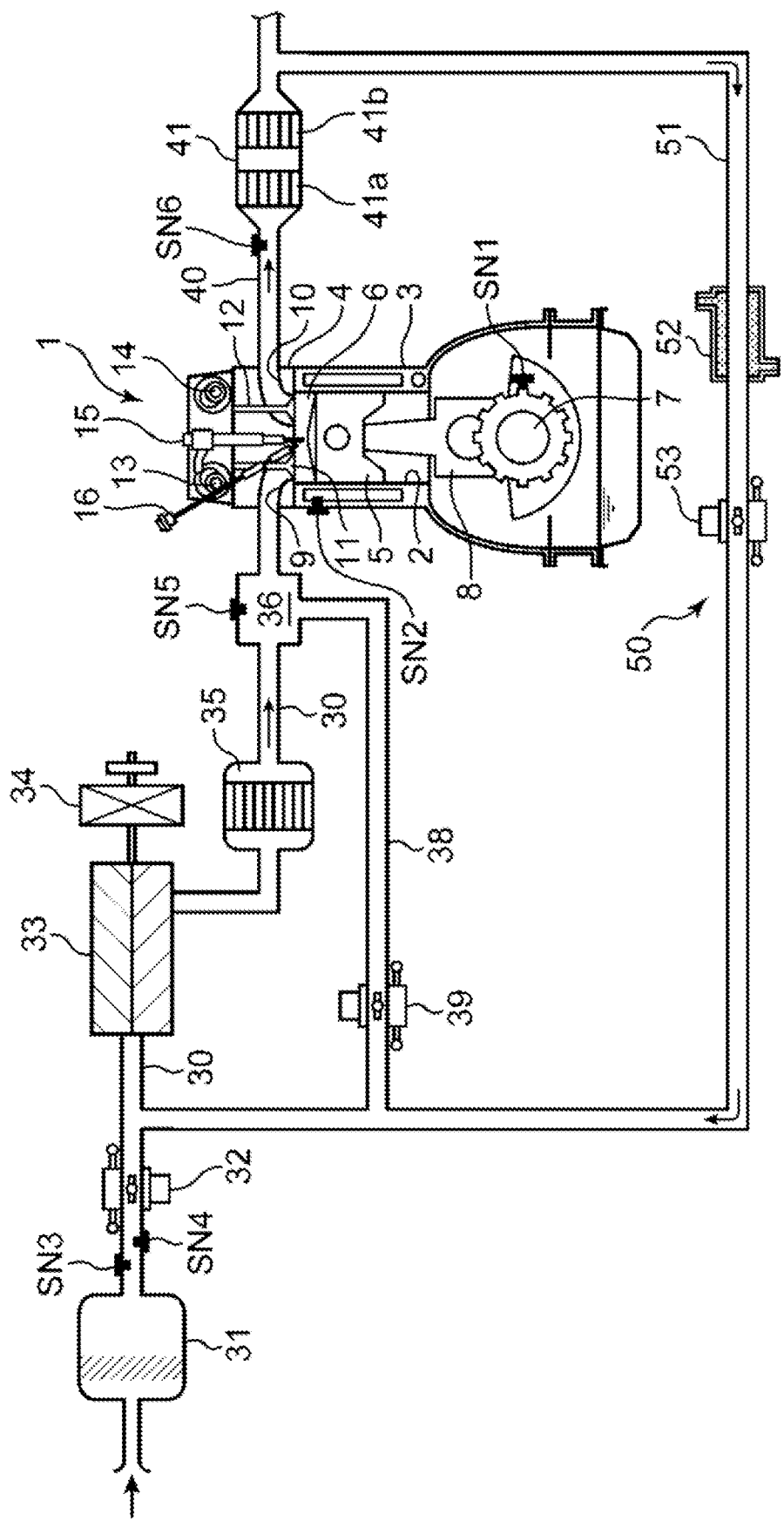
FIG. 1 is a system view illustrating the overall configuration of an engine system according to one embodiment of the present disclosure.

In an engine system illustrated in FIG. 1, an engine is a four-stroke gasoline-direct-injection engine mounted on a vehicle, and serves as a drive source for traveling. The engine is provided with an engine body 1, an intake passage 30 through which intake air to be introduced into the engine body 1 passes, an exhaust passage 40 through which exhaust gas discharged from the engine body 1 passes, and an external exhaust gas recirculation (EGR) device 50 which recirculates part of the exhaust gas passing through the exhaust passage 40 to the intake passage 30.

The engine body 1 has a cylinder block 3 in which cylinders 2 are formed, a cylinder head 4 attached to an upper surface of the cylinder block 3 to close the cylinders 2 from above, and pistons 5 each reciprocatably inserted into the cylinder 2.

A combustion chamber 6 is defined above the piston 5, and fuel containing gasoline as a main component is supplied to the combustion chamber 6 by being injected from an injector 15 (described later). Then, the supplied fuel is mixed with air and combusts inside the combustion chamber 6, and an expansion force caused by the combustion reciprocates the piston 5 in an up-and-down direction.

Below the piston 5, a crankshaft 7 which is an output shaft of the engine body 1 is provided. The crankshaft 7 is coupled to the piston 5 via a connecting rod 8, and is rotary-driven about its center axis corresponding to the reciprocating motion (up-and-down motion) of the piston 5.

The cylinder block 3 is provided with a crank angle sensor SN1 which detects a rotational angle of the crankshaft 7 (crank angle), and a rotational speed of the crankshaft 7 (engine speed), and a water temperature sensor SN2 which detects the temperature of coolant (engine water temperature) which passes through inside the cylinder block 3 and the cylinder head 4.

The cylinder head 4 is provided with an intake port 9 which introduces air supplied from the intake passage 30 to the combustion chamber 6, an exhaust port 10 which discharges exhaust gas generated inside the combustion chamber 6 to the exhaust passage 40, an intake valve 11 which opens and closes the opening of the intake port 9 on the combustion chamber 6 side, and an exhaust valve 12 which opens and closes the opening of the exhaust port 10 on the combustion chamber 6 side.

The intake valve 11 and the exhaust valve 12 are driven to open and close interlockingly with the rotation of the crankshaft 7, by a valve mechanism including a pair of camshafts provided to the cylinder head 4.

An intake S-VT 13, which can change the open and close timings of the intake valve 11, is built in the valve mechanism for the intake valve 11. Similarly, an exhaust S-VT 14, which can change the open and close timings of the exhaust valve 12, is built in the valve mechanism for the exhaust valve 12. The intake S-VT 13 (exhaust S-VT 14) is a so-called variable phase mechanism, and simultaneously changes the open timing and the close timing of the intake valve 11 (exhaust valve 12) by the same amount.

As illustrated in FIG. 1, the cylinder head 4 is provided with the injector 15 which injects fuel (gasoline) into the combustion chamber 6, and a spark plug 16 which ignites a mixture gas of intake air with fuel injected from the injector 15 into the combustion chamber 6. The injector 15 is disposed at the central part of a ceiling surface of the combustion chamber 6 such that a tip-end part of the injector 15 opposes to the central part of a crown surface of the piston 5. The spark plug 16 is disposed at a position somewhat deviated to the intake side with respect to the injector 15.

As illustrated in FIG. 1, the intake passage 30 is connected to one side surface of the cylinder head 4 to be communicated with the intake port 9. Air (fresh air) taken-in from an upstream end of the intake passage 30 is introduced into the combustion chamber 6 through the intake passage 30 and the intake port 9.

The intake passage 30 is provided with an air cleaner 31 which removes foreign matter contained in the intake air, a throttle valve 32 which is openable and closable to control a flow rate of the intake air, a supercharger 33 which compresses and sends out the intake air, an intercooler 35 which cools the intake air compressed by the supercharger 33, and a surge tank 36, in this order from the upstream side of the intake passage 30.

The intake passage 30 is provided, at the corresponding parts, with an airflow sensor SN3 which detects the flow rate of the intake air, an intake temperature sensor SN4 which detects the temperature of the intake air, and an intake pressure sensor SN5 which detects the pressure of the intake air. The airflow sensor SN3 and the intake temperature sensor SN4 are provided at a part of the intake passage 30 between the air cleaner 31 and the throttle valve 32 so as to detect the flow rate and the temperature of the intake air passing through this part, respectively. The intake pressure sensor SN5 is provided to the surge tank 36 to detect the pressure of the intake air inside the surge tank 36.

The supercharger 33 is a mechanical supercharger which is mechanically linked with the engine body 1. Although the configuration of the supercharger 33 is not particularly limited in detail, a known supercharger, such as a Lysholm-type, a Roots-type, or a centrifugal-type, may be used as the supercharger 33.

The supercharger 33 is driven by the crankshaft 7 of the engine body 1. The supercharger 33 is disposed in the intake passage 30 communicating with the combustion chamber 6 via the intake port 9 of the engine body 1.

An electromagnetic clutch 34 electrically switchable between engagement and disengagement is interposed between the supercharger 33 and the engine body 1. The electromagnetic clutch 34 disconnectably connects the crankshaft 7 to the supercharger 33. That is, when the electromagnetic clutch 34 is engaged, a drive force is transmitted from the engine body 1 to the supercharger 33 so that the supercharger 33 performs boosting. On the other hand, when the electromagnetic clutch 34 is disengaged, the transmission of the drive force is interrupted so that the boosting by the supercharger 33 is suspended.

The electromagnetic clutch 34 takes a short amount of time to be engaged after receiving a control signal from a powertrain control module (PCM) 100 (described later), and the connection of the supercharger 33 can be made earlier.

The intake passage 30 is provided with a bypass passage 38 which bypasses the supercharger 33. The bypass passage 38 connects the surge tank 36 and an EGR passage 51 (described later). The bypass passage 38 is provided with an openable bypass valve 39.

The exhaust passage 40 is connected to the other side surface (opposite from the intake passage 30) of the cylinder head 4 to be communicated with the exhaust port 10. Burnt gas generated inside the combustion chamber 6 is discharged outside through the exhaust port 10 and the exhaust passage 40.

The exhaust passage 40 is provided with a catalytic converter 41. The catalytic converter 41 includes a three-way catalyst 41a which removes harmful substances (HC, CO, and NOR) contained in the exhaust gas passing through the exhaust passage 40, and a GPF (Gasoline Particulate Filter) 41b which captures particulate matter (PM) contained in the exhaust gas.

An air/fuel (A/F) sensor SN6 which detects an oxygen concentration in the exhaust gas is provided to a part of the exhaust passage 40 upstream of the catalytic converter 41.

The external EGR device 50 includes the EGR passage 51 connecting the exhaust passage 40 to the intake passage 30, an EGR cooler 52, and an EGR valve 53 which are provided to the EGR passage 51. The EGR passage 51 connects a part of the exhaust passage 40 downstream of the catalytic converter 41, to a part of the intake passage 30 between the throttle valve 32 and the supercharger 33. The EGR cooler 52 cools, by heat exchange, exhaust gas (external EGR gas) recirculating from the exhaust passage 40 to the intake passage 30 through the EGR passage 51. The EGR valve 53, which is able to open and close, is provided to the EGR passage 51 downstream of the EGR cooler 52 (closer side to the intake passage 30), and controls a flow rate of the exhaust gas passing through the EGR passage 51.

(2) Control System

Figure 2:
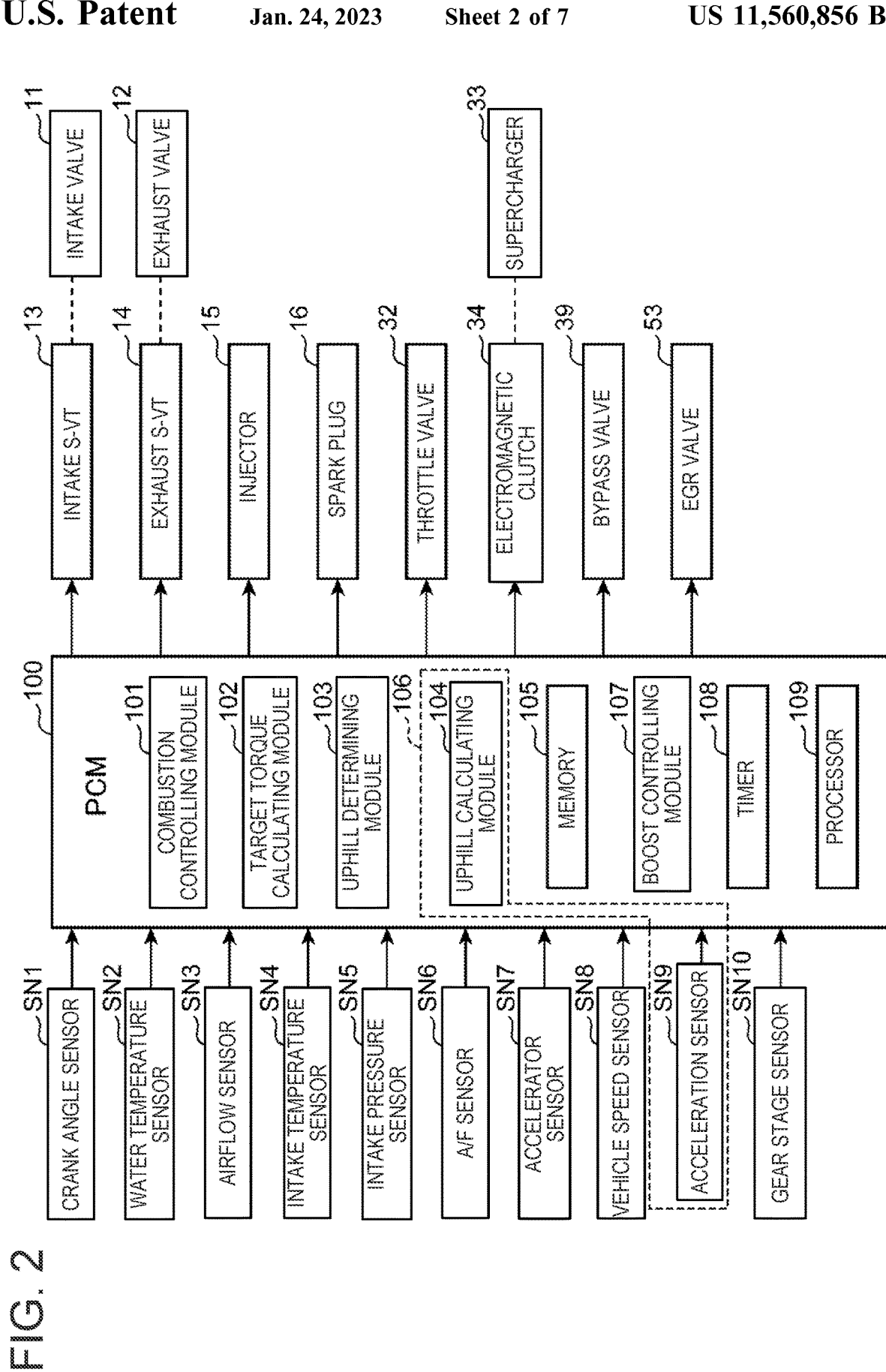
FIG. 2 is a block diagram illustrating a control system of the engine system illustrated in FIG. 1.

FIG. 2 is a block diagram illustrating a control system of the engine system. The PCM 100 (controller) illustrated in FIG. 2 is a microcomputer which integrally controls the engine, etc., and may be comprised of a well-known processor (e.g., a central processing unit (CPU)), memory (e.g., ROM and/or RAM), etc.

The PCM 100 receives inputs of detection signals from the various sensors. For example, the PCM 100 is electrically connected to the crank angle sensor SN1, the water temperature sensor SN2, the airflow sensor SN3, the intake temperature sensor SN4, the intake pressure sensor SN5, and the A/F sensor SN6 described above, and information detected by these sensors (i.e., the crank angle, the engine speed, the engine water temperature, the intake flow rate, the intake temperature, the intake pressure, and the oxygen concentration in exhaust gas) is sequentially inputted into the PCM 100.

Moreover, the vehicle is provided with an accelerator sensor SN7 which detects an opening of an accelerator pedal (hereinafter, referred to as an "accelerator opening") which is operated by a driver who drives the vehicle, a vehicle speed sensor SN8 which detects a traveling speed of the vehicle (hereinafter, referred to as a "vehicle speed"), an acceleration sensor SN9 which detects an acceleration of the vehicle, and a gear stage sensor SN10 which detects a gear stage of a transmission. Detection signals by these sensors SN7 to SN10 are also sequentially inputted into the PCM 100.

The PCM 100 controls each part of the engine while executing various determinations and calculations based on the input information from the various sensors described above. That is, the PCM 100 is electrically connected to, for example, the intake S-VT 13, the exhaust S-VT 14, the injector 15, the spark plug 16, the throttle valve 32, the electromagnetic clutch 34, the bypass valve 39, and the EGR valve 53, and outputs control signals to these devices based on the result of the calculations etc.

In detail, the PCM 100 which is an example of a "controller" of the present disclosure includes a processor 109, a combustion controlling module 101, a target torque calculating module 102, an uphill determining module 103, an uphill calculating module 104, a memory 105, a boost controlling module 107, and a timer 108 used for retarding the disengagement of the electromagnetic clutch 34 by a given period of time. The modules are executed by the processor 109 to perform their respective functions and are stored in the memory 105 as software modules.

The combustion controlling module 101 is a control module which controls combustion of the mixture gas in the combustion chamber 6, and controls each part of the engine so that, for example, output torque of the engine becomes an appropriate value corresponding to a driver's demand.

The target torque calculating module 102 calculates a target engine torque TQ based on, for example, the accelerator opening detected by the accelerator sensor SN7 (in detail, based on the accelerator opening, the gear stage, the vehicle speed, and the engine speed).

The uphill determining module 103 determines whether an uphill angle θ detected by an uphill-angle detecting module 106 (described later) is above a first threshold θ1 (first uphill angle). Moreover, the uphill determining module 103 also determines whether the uphill angle θ is below a second threshold θ2 (second uphill angle) lower than the first threshold θ1.

The boost controlling module 107 controls the engagement of the electromagnetic clutch 34 based on the determination result of the uphill determining module 103. Detailed method of the engagement control will be described later.

The uphill-angle detecting module 106 may have any configuration, as long as it detects the uphill angle θ during the traveling of the vehicle. In this embodiment, the uphill-angle detecting module 106 is comprised of the acceleration sensor SN9 and the uphill calculating module 104. The uphill calculating module 104 is provided to the PCM 100, and calculates the climbing angle of the vehicle (the uphill angle θ) based on the vehicle acceleration detected by the acceleration sensor SN9. Therefore, the uphill determining module 103 determines whether the uphill angle θ is above the first threshold θ1 based on the uphill angle θ calculated by the uphill calculating module 104.

The acceleration sensor SN9 is provided to the vehicle, and detects the vehicle acceleration. The acceleration sensor SN9 may have any configuration, as long as it detects the vehicle acceleration, and an existing G-sensor, etc. may be used as the acceleration sensor SN9.

Note that the configuration of the uphill-angle detecting module 106 of the present disclosure is not limited to the one having the acceleration sensor SN9 and the uphill calculating module 104, but an uphill angle sensor detectable of the uphill angle θ may be used as the uphill-angle detecting module 106.

(3) Combustion Control of Engine

Figure 3:
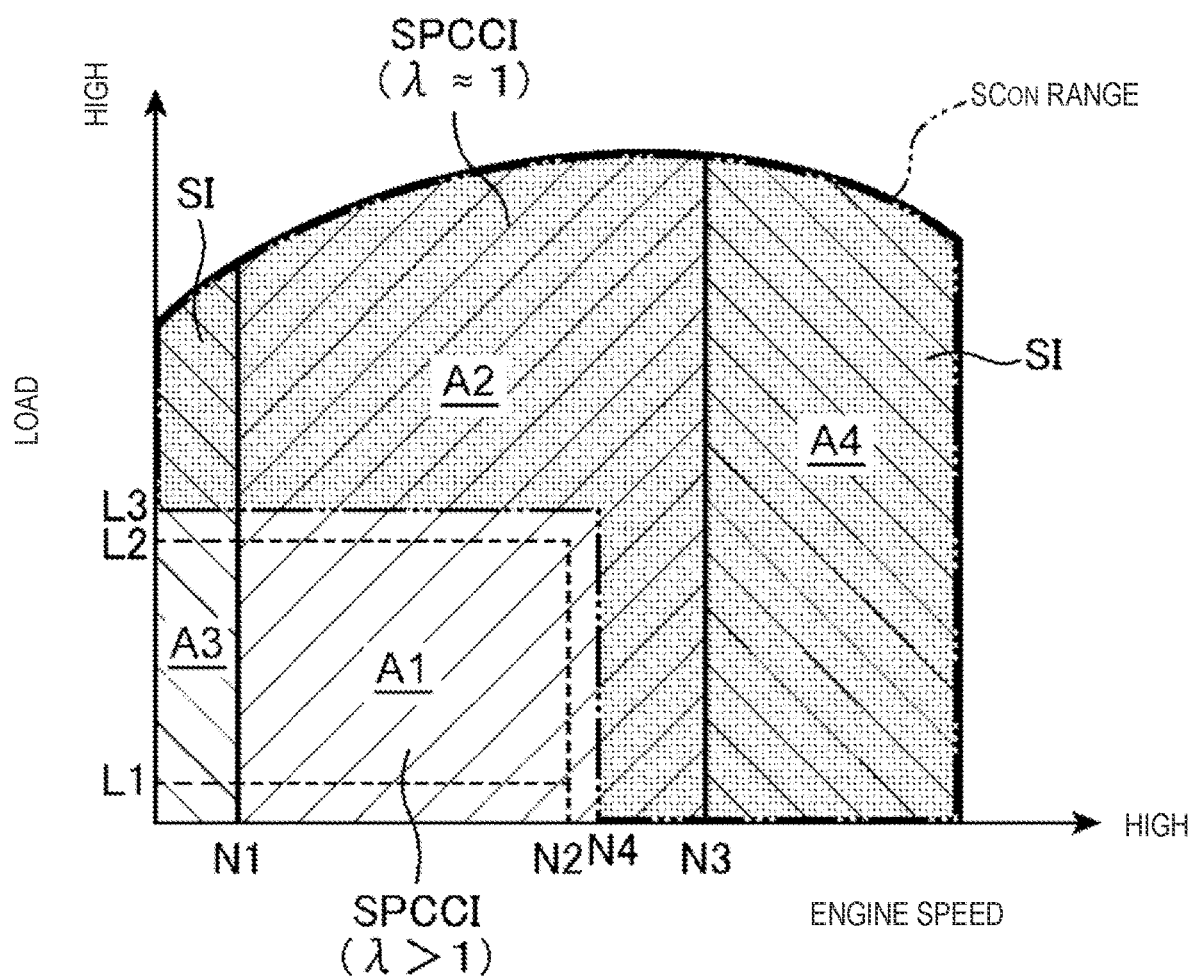
FIG. 3 is an operation map illustrating operation ranges of an engine, and a boosting range of a supercharger.

Next, combustion control of the engine is described. FIG. 3 is an operation map illustrating operation ranges of the engine, and a boosting range of the supercharger 33 in which boosting is performed.

As indicated in FIG. 3, the operation range of the engine is roughly divided into four operation ranges A1 to A4 according to the combustion mode. Suppose that the four operation ranges are a first operation range A1, a second operation range A2, a third operation range A3, and a fourth operation range A4, respectively, the third operation range A3 is a lowest-speed range where the engine speed is below a first speed N1, the fourth operation range A4 is a high-speed range where the engine speed is above a third speed N3, the first operation range A1 is a range where the load is comparatively low within a speed range (low/middle-speed range) other than the third and fourth operation ranges A3 and A4 (i.e., a low-speed/low-load range), and the second operation range A2 is the remainder of the range other than the first, third, and fourth operation ranges A1, A3, and A4.

In the example of FIG. 3, the first operation range A1 is a range having a substantially rectangular shape positioned inward of the second operation range A2, and surrounded by the first speed N1 which is the minimum speed of the second operation range A2, a second speed N2 which is lower than the maximum speed (the third speed N3) of the second operation range A2, a first load L1 higher than the minimum engine load, and a second load L2 higher than the first load L1.

In the first operation range A1 (the low-speed/low-load range), partial compression ignition combustion (hereinafter, referred to as "SPCCI combustion") in which the SI combustion and CI (Compression Ignition) combustion are combined is carried out. The SI combustion is a combustion mode in which the mixture gas is ignited by a spark generated from the spark plug 16, and the combusting range is spread from the ignition point to the surrounding so that the mixture gas is forcibly combusted by flame propagation. The CI combustion is a combustion mode in which the mixture gas is combusted by self-ignition under an environment sufficiently increased in the temperature and pressure as a result of compression by the piston 5, etc. The SPCCI combustion, which is the combination of the SI combustion and the CI combustion, is a combustion mode in which part of the mixture gas inside the combustion chamber 6 is combusted by spark ignition (SI combustion) immediately before the self-ignition of the mixture gas, and the remaining mixture gas inside the combustion chamber 6 is combusted by self-ignition (CI combustion) after the SI combustion (by the further increase in the temperature and pressure resulting from the SI combustion). Note that "SPCCI" is the abbreviation of the "SPark Controlled Compression Ignition."

Figure 4:
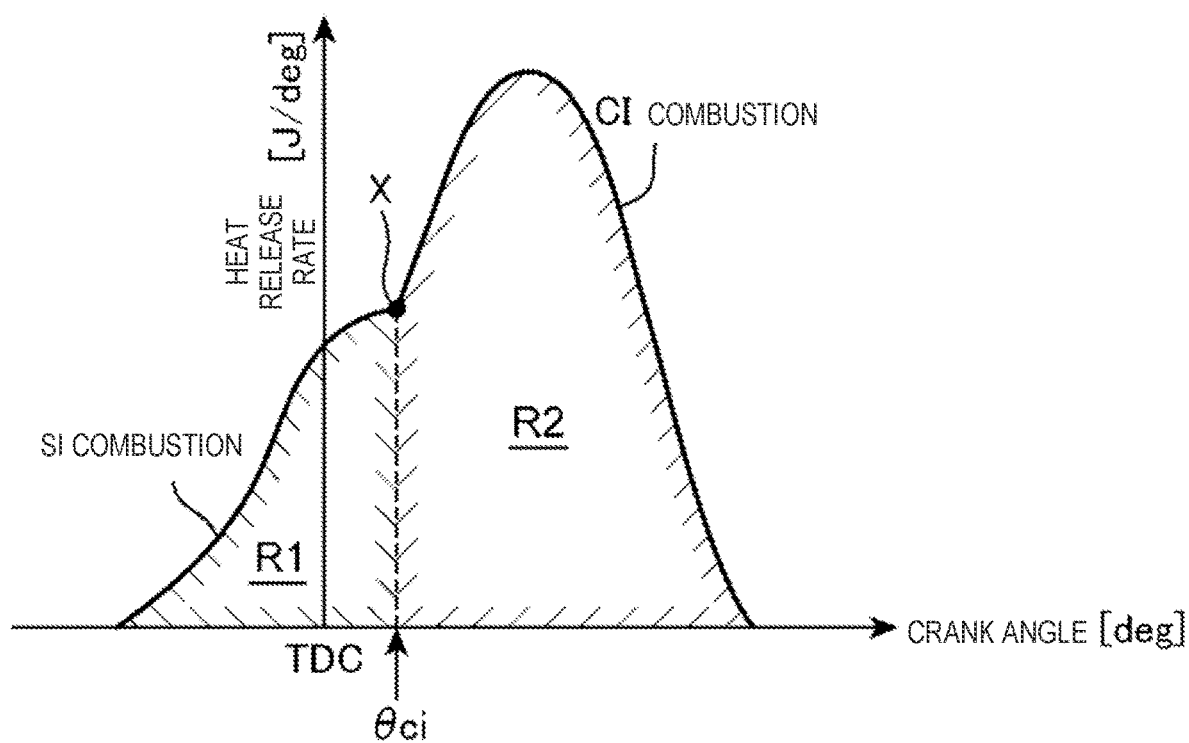
FIG. 4 is a graph illustrating a waveform of a heat release rate during SPCCI (SPark Controlled Compression Ignition) combustion.

FIG. 4 is a graph illustrating a combustion waveform during the SPCCI combustion (i.e., a change in a heat release rate (J/deg) with respect to the crank angle). As illustrated in FIG. 4, in the SPCCI combustion, a heat release by the SI combustion and a heat release by the CI combustion consecutively occur in this order. Here, due to the nature that the combustion speed is higher in the CI combustion, an initial rise of the heat release is sharper in the CI combustion compared with the SI combustion. Therefore, the waveform of the heat release rate in the SPCCI combustion has an inflection point X which appears at a switching timing (θci) from the SI combustion (R1) to the CI combustion (R2).

As a concrete mode of the SPCCI combustion described above, a control is executed such that the mixture gas is combusted by the SPCCI combustion while an A/F lean mixture gas having an air-fuel (A/F) ratio higher than the stoichiometric A/F ratio is formed inside the combustion chamber 6 (in other words, the mixture gas at λ>1 (λ is an excess air ratio) is combusted by the SPCCI combustion). Here, the opening of the throttle valve 32 is set to a comparatively large value such that an amount of air, which is larger than the air amount corresponding to the stoichiometric A/F ratio, is introduced into the combustion chamber 6 through the intake passage 30. That is, within the first operation range A1, a target value of the A/F ratio (a weight ratio of air (fresh air) introduced into the combustion chamber 6 through the intake passage 30 to fuel injected into the combustion chamber 6 from the injector 15) is set to a value which is sufficiently larger than the stoichiometric A/F ratio (14.7:1). Then, the opening of the throttle valve 32 achievable of the target value of the A/F ratio (target A/F ratio) is determined every time, and the throttle valve 32 is controlled based on this determination.

Note that, in a cold state of the engine (a state where the temperature of the engine wall (the temperature of the cylinder block 3) is at or below 30° C.), the SI combustion is executed in all the operation ranges A1 to A4 of FIG. 3. Moreover, in a semi-warm state of the engine (a state where the engine wall temperature is at or above 30° C. and at or below 80° C.), the operation range A1 does not exist, but is included in the operation range A2, whereas in a fully warm state (a state where the engine wall temperature is at or above 80° C.), the operation range A1 exists.

(4) Control of Supercharger 33

In the map illustrated in FIG. 3, in an SCon range (a dotted area surrounded by a two-dot chain line) corresponding to any of the case where the engine load is above a load L3 or the case where the engine speed is above a fourth speed N4 within the entire operation ranges A1 to A4 of the engine, the electromagnetic clutch 34 connects the crankshaft 7 to the supercharger 33 so that the supercharger 33 becomes the boosting state, that is, is operated to perform boosting. Note that the engine speed N4 is set within a range above a maximum value N2 of the engine speed of the operation range A1, and below a minimum value N3 of the engine speed of the operation range A4.

On the other hand, in the other range of the map illustrated in FIG. 3 (i.e., a range below the engine load L3 and below the engine speed N4), the supercharger 33 is in a non-boosting state, that is, is not operated to perform boosting.

During normal traveling, when the engine operates in the SCon range of the map in FIG. 3 based on the engine load and the engine speed, the supercharger 33 is controlled to be in the boosting state. On the other hand, according to the present disclosure, while traveling an uphill (during the uphill-traveling), the supercharger 33 is controlled to be in the boosting state based on the uphill angle θ in priority to the map in FIG. 3, thereby the response delay of the supercharger 33 and the acceleration delay of the vehicle during the uphill-traveling being reduced.

Figure 5:
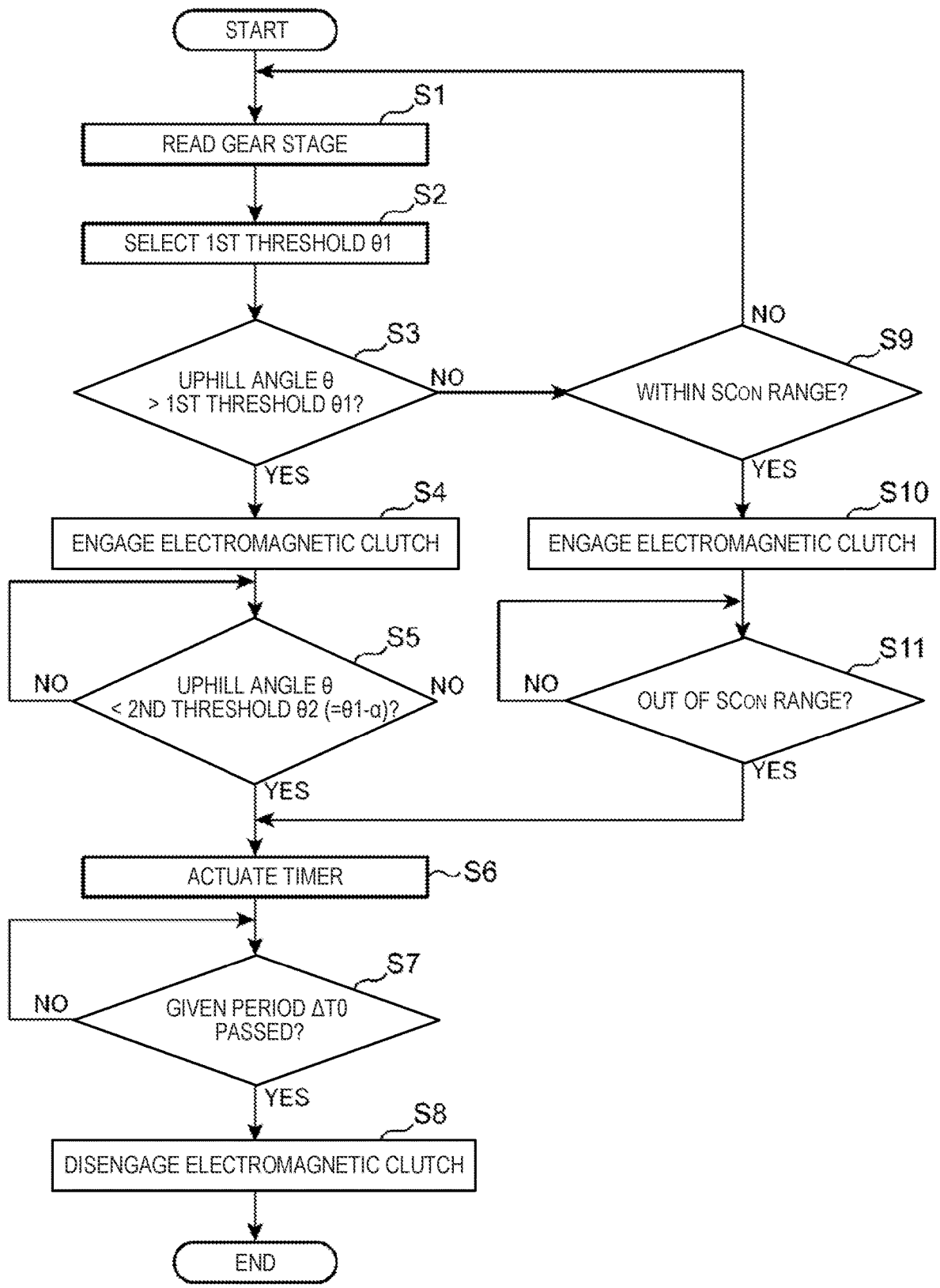
FIG. 5 is a flowchart of a control of an electromagnetic clutch illustrated in FIG. 1.
Figure 6:
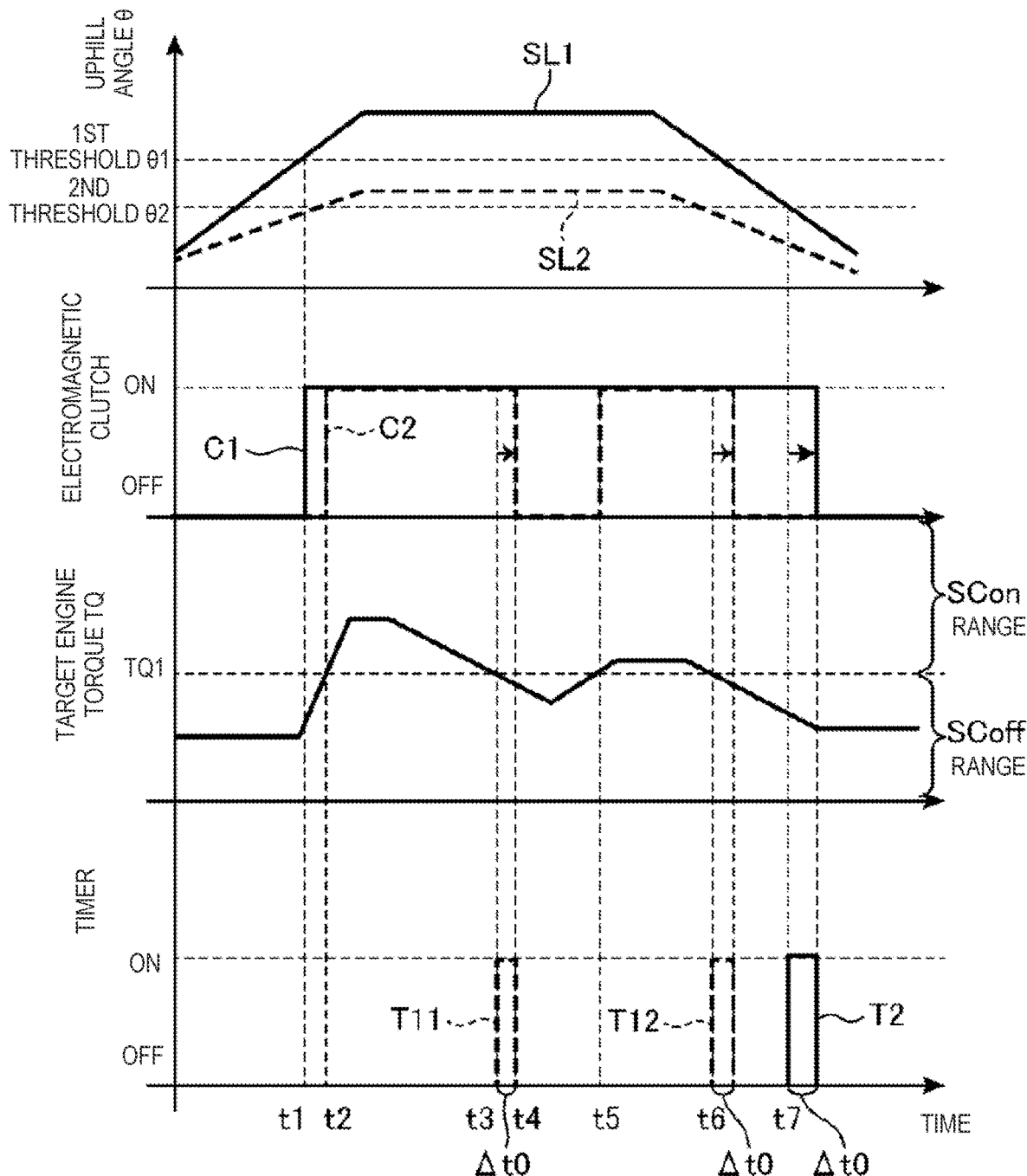
FIG. 6 is a time chart related to an uphill angle, ON-OFF of the electromagnetic clutch, a target engine torque, and a timer actuation, for controlling the electromagnetic clutch illustrated in FIG. 1.

That is, the boost controlling module 107 according to this embodiment controls the electromagnetic clutch 34 to connect the crankshaft 7 to the supercharger 33 when the uphill determining module 103 determines that the uphill angle θ is above the first threshold θ1 (see step S3 in FIG. 5 and a time t1 in FIG. 6 described later) even when the target engine torque TQ is in a non-boosting range (see an SCoff range in FIG. 6).

In other words, when the uphill determining module 103 determines that the uphill angle θ calculated by the uphill calculating module 104 is above the first threshold θ1, the boost controlling module 107 controls the supercharger 33 to boost regardless of the target engine torque TQ calculated by the target torque calculating module 102.

Then, when the uphill determining module 103 determines that the uphill angle θ has fallen below the second threshold θ2 lower than the first threshold θ1 (see step S5 in FIG. 5 and a time t7 in FIG. 6 described later), the boost controlling module 107 controls the electromagnetic clutch 34 to disconnect the crankshaft 7 from the supercharger 33.

The second threshold θ2 may be any angle, as long as it is lower than the first threshold θ1, and is set to an angle, for example, about 1% lower than the first threshold θ1 (i.e., 0.99×θ1).

Moreover, in this embodiment, the timer 108 is actuated when the uphill determining module 103 determines that the uphill angle θ is below the second threshold θ2.

The boost controlling module 107 controls the electromagnetic clutch 34 to disconnect the crankshaft 7 from the supercharger 33 after the timer 108 carries out the measurement for a given period of time (e.g., one second) (see step S7 in FIG. 5 and the time t7 in FIG. 6).

The first threshold θ1 is set to be lower as the gear stage of the transmission becomes higher. Information on the gear stage of the transmission is sequentially transmitted to the PCM 100 by the gear stage sensor SN10.

Figure 7:
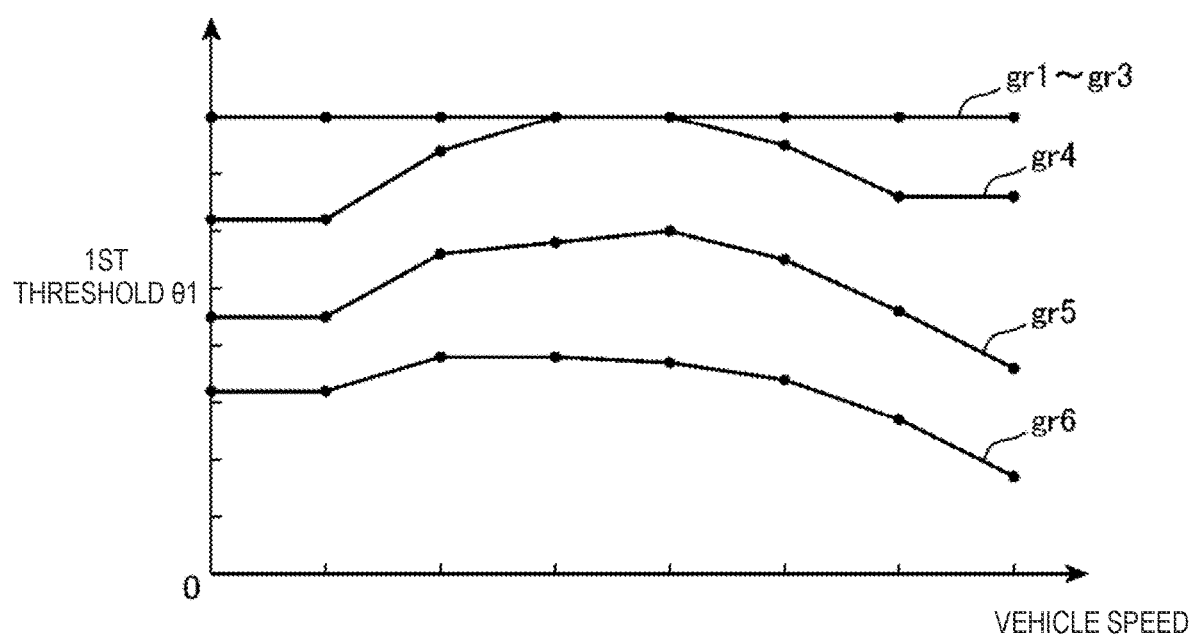
FIG. 7 is a graph illustrating a relationship between vehicle speeds at first to sixth gear stages of a transmission, respectively, and a first threshold.

Information on the first threshold θ1 for each of the transmission gear stages illustrated in a graph of FIG. 7 (in FIG. 7 six stages from gr1 to gr6) is stored in the memory 105 of the PCM 100. In the graph of FIG. 7, a relationship between a vehicle speed V and the first threshold θ1 (angle) is indicated for each of the six stages (gr1 to gr6), and the first threshold θ1 is uniquely determined based on the gear stage and the vehicle speed V.

As illustrated in FIG. 7, when the vehicle speed V is the same, the first threshold θ1 is set to be lower as the gear stage (e.g., the fourth stage gr4 to the sixth stage gr6) becomes higher. The first threshold θ1 is arbitrarily set within a range, for example, from 1 to 8 degrees.

Although in the graph of FIG. 7 the first threshold θ1 is set to be the same for the first to third gear stages (gr1 to gr3), the first threshold θ1 may be set to be lower as the gear stage is upshifted from the first stage to the third stage.

(Control Flowchart of Electromagnetic Clutch 34)

The engine system configured as described above executes the operation control of the supercharger 33 during the uphill-traveling (in detail, the control of the electromagnetic clutch 34) in the following process.

As illustrated in the flowchart of FIG. 5, at step S1, the PCM 100 first reads the current gear stage of the transmission from the gear stage sensor SN10.

Next, at step S2, the PCM 100 uses the map stored in the memory 105 (see FIG. 7) to select the first threshold θ1 based on the gear stage (e.g., gr1 to gr6 in the case of six stages) and the vehicle speed V.

Next, at Step S3, the uphill determining module 103 determines whether the uphill angle θ is above the first threshold θ1. Here, the uphill angle θ is detected using the uphill-angle detecting module 106 (in detail, the acceleration sensor SN9 and the uphill calculating module 104). That is, the uphill calculating module 104 calculates the uphill angle θ using the acceleration of the vehicle detected by the acceleration sensor SN9.

If the uphill angle θ is above the first threshold θ1, the processing proceeds to step S4 where the boost controlling module 107 controls the electromagnetic clutch 34 to be engaged. Accordingly, the supercharger 33 is connected to the crankshaft 7 to perform boosting.

Referring to the time chart of FIG. 6, this is a timing (t1) at which the uphill angle θ of an uphill line SL1 becomes the first threshold θ1, and the electromagnetic clutch 34 becomes ON to make the supercharger 33 be in the connected state (see an engagement line C1) before a timing (t2) at which the target engine torque TQ reaches a given boosting torque TQ1. Then, even if the operation range is irregularly and repeatedly shifted to any of the boosting range (SCon range) where the target engine torque TQ is above the boosting torque TQ1, and the non-boosting range (SCoff range) where the target engine torque TQ is below the boosting torque TQ1, the connected state of the supercharger 33 is maintained for a long period (see a section from the time t1 to a time t7+Δt0 of the engagement line C1).

Then, when the uphill angle θ decreases as indicated by the uphill line SL1 in FIG. 6 in the latter half of the uphill-traveling, the uphill determining module 103 determines, at step S5, whether the uphill angle θ is below the second threshold θ2 which is lower than the first threshold θ1 (θ2=θ1−α).

If the uphill angle θ is below the second threshold θ2 lower than the first threshold θ1, the processing proceeds to step S6 where the timer 108 is actuated (see a line T2 indicative of the timer actuation at the time t7; note that, step S5 is repeated if the uphill angle θ is above the second threshold θ2).

After the timer 108 counts a given period of time Δt0 (e.g., 1 second) (step S7), the processing proceeds to step S8 where the boost controlling module 107 controls the electromagnetic clutch 34 to be disengaged. Accordingly, the supercharger 33 is disconnected from the crankshaft 7 to suspend the boosting.

Therefore, as described above, in the connection control of the supercharger 33 when the uphill angle θ is above the first threshold θ1, the connection of the supercharger 33 is maintained even if the target engine torque TQ decreases to be within the not-boosting range during the uphill-traveling (see times t3 and t6), and the connected state of the supercharger 33 is canceled only when the uphill angle θ has fallen below the given second threshold θ2. Thus, the connection of the supercharger 33 can be maintained for a long period regardless of the engine load during the uphill-traveling, which reduces the response delay of the supercharger 33.

Note that after the engagement of the electromagnetic clutch 34 (step S4) and before the determination that the uphill angle θ is below the second threshold θ2 (step S5) (for example, at immediately before the time t7 of the time chart in FIG. 6), when the engine operation range becomes the boosting range (the SCon range in FIG. 3) (i.e., when the target engine torque TQ becomes above the boosting torque TQ1) while the uphill angle θ is decreasing, the engagement of the electromagnetic clutch 34 may be maintained (the engagement line C1 may be maintained ON) also after the time t7.

Moreover, while the timer 108 counts the Δt0 after the determination that the uphill angle θ is below the second threshold θ2 (step S5), when the engine operation range becomes the boosting range (the SCon range in FIG. 3) (i.e., when the target engine torque TQ becomes above the boosting torque TQ1), or when the uphill angle θ becomes above the first threshold θ1 or the second threshold θ2, the engagement of the electromagnetic clutch 34 may be maintained (the engagement line C1 may be maintained ON) also after the time t7.

On the other hand, if the uphill angle θ is below the first threshold θ1 at step S3 (i.e., the case of an uphill line SL2 in FIG. 6), the processing proceeds to step S9 where a normal connection control of the supercharger 33 (see an engagement line C2 in FIG. 6) is executed.

That is, at step S9, if the engine operation range becomes within the SCon range illustrated in the map of FIG. 3 at the time t2 (at which the target engine torque TQ becomes above the boosting torque TQ1 corresponding to the operation range falling within the SCon range), the processing proceeds to step S10 where the boost controlling module 107 controls the electromagnetic clutch 34 to be engaged, and the supercharger 33 starts boosting. Note that if the engine operation range is not in the SCon range at step S9, the processing returns to step S1.

Next, at step S11, if the engine operation range becomes outside the SCon range at the time t3 (at which the target engine torque TQ has fallen below the boosting torque TQ1), as illustrated at steps S6 to S8 described above, the timer 108 counts the given time period Δt0 (see a line T11 indicative of the timer actuation at the time t3), and then, the boost controlling module 107 controls the electromagnetic clutch 34 to be disengaged, and suspends the boosting of the supercharger 33 (see a time t4 of the engagement line C2 in FIG. 6).

Moreover, if the engine operation range again becomes in the SCon range at the time t5 (at which the target engine torque TQ becomes above the boosting torque TQ1) after the suspension of the supercharger 33, the supercharger 33 again starts boosting, and then, if the engine operation range becomes outside the SCon range at a time t6 (at which the target engine torque TQ has fallen below the boosting torque TQ1), the supercharger 33 suspends boosting after the timer 108 counts the given time period Δt0 (time t6+Δt0, see a line T12). In such a normal connection control of the supercharger 33 (see the engagement line C2 in FIG. 6), the disengagement of the electromagnetic clutch 34 is repeated during the uphill-traveling (here, boosting is not performed for a long period between the time t4 and the time t5), and therefore, maintaining the connection of the supercharger 33 is difficult, and the response delay of the supercharger 33 easily occurs.

Moreover, in terms of the length of the boosting period, in the engagement control of the electromagnetic clutch 34 based on the uphill angle θ which is the characteristic of the present disclosure (see steps S3 to S5 in FIG. 5, particularly), as indicated by the engagement line C1 in FIG. 6, the boosting is maintained for a long period from the time t1 to the time t7+Δt0, and thus, it is understood that the response delay of the supercharger 33 during the uphill-traveling is unlikely to occur. On the other hand, in the engagement control of the electromagnetic clutch 34 based on the SCon range in FIG. 3 (see steps S9 to S11 in FIG. 5, particularly), as indicated by the engagement line C2 in FIG. 6, the boosting is maintained only intermittently for a short period from the time t2 to the time t4, and from the time t5 to the time t6+Δt0. It is understood that, in such an intermittent engagement control, the response delay of the supercharger 33 during the uphill-traveling easily occurs.

(Characteristics of this Embodiment)

(1) The engine system of this embodiment includes the mechanical supercharger 33 driven by the crankshaft 7 of the engine body 1, the electromagnetic clutch 34 disconnectably connecting the crankshaft 7 to the supercharger 33, and the PCM 100 configured to output the control signal to the electromagnetic clutch 34. The PCM 100 includes the uphill-angle detecting module 106 (in this embodiment, the detecting module comprised of the acceleration sensor SN9 and the uphill calculating module 104) configured to detect the uphill angle θ during traveling of the vehicle, the uphill determining module 103 configured to determine whether the uphill angle θ detected by the uphill-angle detecting module 106 is above the first threshold θ1, and the boost controlling module 107 configured to, when the uphill determining module 103 determines that the uphill angle θ is above the first threshold θ1, control the electromagnetic clutch 34 to connect the crankshaft 7 to the supercharger 33 even when the target torque of the engine is within the non-boosting range.

According to this embodiment, when the uphill determining module 103 determines that the uphill angle θ detected by the uphill-angle detecting module 106 is above the first threshold θ1, the boost controlling module 107 controls the electromagnetic clutch 34 to connect the crankshaft 7 to the supercharger 33 even if the target torque of the engine falls within the non-boosting range. Therefore, even when the engine load changes according to the change in the accelerator opening during the uphill-traveling, the supercharger 33 can always perform boosting regardless of the engine load when the uphill angle θ is above the first threshold θ1. Therefore, the response delay of the boosting can be reduced, and the acceleration delay of the vehicle can be reduced.

(2) In the engine system of this embodiment, the boost controlling module 107 controls the electromagnetic clutch 34 to disconnect the crankshaft 7 from the supercharger 33 when the uphill determining module 103 determines that the uphill angle θ has fallen below the second threshold θ2 lower than the first threshold θ1.

According to this embodiment, since the electromagnetic clutch 34 is disengaged after the uphill angle θ has fallen below the second threshold θ2 lower than the first threshold θ1, the disengagement of the electromagnetic clutch 34 can be delayed, and the boosting period continued during the uphill-traveling can be made longer. As a result, the response delay in the re-acceleration during the uphill-traveling can be reduced for a long period.

(3) In the engine system of this embodiment, the PCM 100 (controller) further includes the timer 108. The timer 108 is actuated when the uphill determining module 103 determines that the uphill angle θ has fallen below the second threshold θ2, and the boost controlling module 107 controls the electromagnetic clutch 34 to disconnect the crankshaft 7 from the supercharger 33 after the timer 108 measures the given period of time.

According to this embodiment, by using the timer 108, the timing to disengage the electromagnetic clutch 34 can be delayed for the given period which is set arbitrarily, and thus, the boosting period continued during the uphill-traveling can be made longer.

(4) In the engine system of this embodiment, the first threshold θ1 is set to be smaller as the gear stage of the transmission becomes higher.

There is a tendency that the engine speed decreases and the acceleration of the vehicle takes longer time as the transmission gear stage is shifted up. Here, according to this embodiment, by setting the first threshold θ1 to be lower as the transmission gear stage is shifted higher, the electromagnetic clutch 34 can be engaged early even when the transmission gear stage is high during the uphill-traveling, and thus, the response delay in the re-acceleration during the uphill-traveling can be reduced.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
7 Crankshaft
33 Supercharger
34 Electromagnetic Clutch
100 PCM (Powertrain Control Module) (Controller)
102 Target Torque Calculating Module
103 Uphill Determining Module
104 Uphill Calculating Module
106 Uphill-angle Detecting Module
107 Boost Controlling Module
108 Timer
SN9 Acceleration Sensor
SN10 Gear Stage Sensor

What is claimed is:

1. An engine system, comprising:
a supercharger driven by a crankshaft of an engine;
an electromagnetic clutch disconnectably connecting the crankshaft to the supercharger; and
a controller configured to output a control signal to the electromagnetic clutch, the controller including a processor configured to execute:
an uphill-angle detecting module to detect an uphill angle during traveling of a vehicle;
an uphill determining module to determine whether the detected uphill angle is above a given first uphill angle greater than zero; and
a boost controlling module to, when the uphill determining module determines that the uphill angle is above the first uphill angle, control the electromagnetic clutch to connect the crankshaft to the supercharger even when a target engine torque is within a non-boosting range,
wherein the boost controlling module controls the electromagnetic clutch to be disengaged when the uphill determining module determines that the uphill angle has fallen below a second uphill angle smaller than the first uphill angle.

2. The engine system of claim 1, wherein the controller further includes a timer,
wherein the timer is actuated when the uphill determining module determines that the uphill angle has fallen below the second uphill angle, and
wherein the boost controlling module controls the electromagnetic clutch to be disengaged after the timer measures a given period of time.

3. The engine system of claim 2, wherein the first uphill angle is set to be smaller as a gear stage of a transmission becomes higher.

4. The engine system of claim 3, wherein the non-boosting range includes a range where spark controlled compression ignition combustion with an excess air ratio higher than 1 is performed.

5. The engine system of claim 3,
wherein the non-boosting range includes a range where spark controlled compression ignition combustion with an excess air ratio higher than 1 is performed, and
wherein a boosting range includes a range where spark ignition combustion, or spark controlled compression ignition combustion with an excess air ratio at 1, is performed.

6. The engine system of claim 2, wherein the non-boosting range includes a range where spark controlled compression ignition combustion with an excess air ratio higher than 1 is performed.

7. The engine system of claim 2,
wherein the non-boosting range includes a range where spark controlled compression ignition combustion with an excess air ratio higher than 1 is performed, and
wherein a boosting range includes a range where spark ignition combustion, or spark controlled compression ignition combustion with an excess air ratio at 1, is performed.

8. The engine system of claim 1, wherein the supercharger is a mechanical supercharger mechanically linked with an engine body.

9. The engine system of claim 8, wherein the non-boosting range includes a range where spark controlled compression ignition combustion with an excess air ratio higher than 1 is performed.

10. The engine system of claim 1, wherein the non-boosting range includes a range where spark controlled compression ignition combustion with an excess air ratio higher than 1 is performed.

11. The engine system of claim 1,
wherein the non-boosting range includes a range where spark controlled compression ignition combustion with an excess air ratio higher than 1 is performed, and
wherein a boosting range includes a range where spark ignition combustion, or spark controlled compression ignition combustion with an excess air ratio at 1, is performed.

12. The engine system of claim 1,
wherein when the uphill determining module determines that the uphill angle is above the first uphill angle, the controller controls the supercharger to perform boosting regardless of the target engine torque calculated by a target torque calculating module, and
wherein when the uphill determining module determines that the uphill angle has fallen below the second uphill angle smaller than the first uphill angle, the controller controls the electromagnetic clutch to disconnect the crankshaft from the supercharger.

13. An engine system, comprising:
a supercharger driven by a crankshaft of an engine;
an electromagnetic clutch disconnectably connecting the crankshaft to the supercharger; and
a controller configured to output a control signal to the electromagnetic clutch, the controller including a processor configured to execute:
   an uphill-angle detecting module to detect an uphill angle during traveling of a vehicle;
   an uphill determining module to determine whether the detected uphill angle is above a given first uphill angle; and
   a boost controlling module to, when the uphill determining module determines that the uphill angle is above the first uphill angle, control the electromagnetic clutch to connect the crankshaft to the supercharger even when a target torque of the engine is within a non-boosting range,
wherein the first uphill angle is set to be smaller as a gear stage of a transmission becomes higher.

14. The engine system of claim 13, wherein the non-boosting range includes a range where spark controlled compression ignition combustion with an excess air ratio higher than 1 is performed.

15. An engine system, comprising:
a supercharger driven by a crankshaft of an engine;
an electromagnetic clutch disconnectably connecting the crankshaft to the supercharger; and
a controller configured to output a control signal to the electromagnetic clutch, the controller including a processor configured to execute:
   an uphill-angle detecting module to detect an uphill angle during traveling of a vehicle;
   an uphill determining module to determine whether the detected uphill angle is above a given first uphill angle; and
   a boost controlling module to, when the uphill determining module determines that the uphill angle is above the first uphill angle, control the electromagnetic clutch to connect the crankshaft to the supercharger even when a target engine torque is within a non-boosting range,
wherein when the uphill determining module determines that the uphill angle is above the first uphill angle, the controller controls the supercharger to perform boosting regardless of the target engine torque calculated by a target torque calculating module,
wherein when the uphill determining module determines that the uphill angle has fallen below a second uphill angle smaller than the first uphill angle, the controller controls the electromagnetic clutch to disconnect the crankshaft from the supercharger,
wherein the controller stores a map defining a relationship between a vehicle speed and the first uphill angle for each gear stage of a transmission,
wherein the first uphill angle is set to be smaller as the gear stage becomes higher at the same vehicle speed.

* * * * *